US006597788B2

(12) United States Patent
James et al.

(10) Patent No.: US 6,597,788 B2
(45) Date of Patent: *Jul. 22, 2003

(54) CRADLE FOR A HANDSET

(75) Inventors: Neil James, Broadwater (GB); Alan Clifford Dowsett, Lancing (GB)

(73) Assignee: Aerotech IFE Limited, Brighton (GB)

( * ) Notice: Subject to any disclaimer, the term of this patent is extended or adjusted under 35 U.S.C. 154(b) by 191 days.

This patent is subject to a terminal disclaimer.

(21) Appl. No.: 09/850,260

(22) Filed: May 7, 2001

(65) Prior Publication Data

US 2002/0015490 A1 Feb. 7, 2002

Related U.S. Application Data

(63) Continuation of application No. 08/987,396, filed on Dec. 9, 1997, now Pat. No. 6,282,289.

(51) Int. Cl.[7] .................................................. H04M 1/00
(52) U.S. Cl. ...................................... 379/446; 379/455
(58) Field of Search ................................. 379/438, 437, 379/446, 454, 455; 439/4, 528

(56) References Cited

U.S. PATENT DOCUMENTS

| | | | |
|---|---|---|---|
| 1,276,825 A | | 8/1918 | Swope |
| 1,446,410 A | | 2/1923 | Bennett et al. |
| 1,958,626 A | | 5/1934 | Krantz |
| 2,211,561 A | | 8/1940 | Flannelly |
| 3,061,234 A | | 10/1962 | Morey |
| 3,374,319 A | | 3/1968 | Stahmer |
| 3,657,491 A | | 4/1972 | Ryder |
| 4,384,688 A | | 5/1983 | Smith |
| 4,646,987 A | | 3/1987 | Peterson |
| 4,989,805 A | | 2/1991 | Burke |
| 5,094,396 A | | 3/1992 | Burke |
| 5,155,766 A | | 10/1992 | Skowronski |
| 5,241,593 A | | 8/1993 | Wagner |
| 5,600,719 A | * | 2/1997 | Lovecky et al. ............ 379/438 |
| 5,718,310 A | * | 2/1998 | Gallo ........................ 379/438 |
| 6,282,289 B1 | * | 8/2001 | James et al. ................ 379/446 |

FOREIGN PATENT DOCUMENTS

| | | |
|---|---|---|
| CA | 950880 | 7/1974 |
| DE | 3518157 | 5/1985 |
| EP | 0462846 | 12/1991 |
| FR | 2549308 | 1/1985 |
| GB | 619519 | 3/1949 |
| GB | 1590160 | 5/1981 |
| GB | 2070567 | 9/1981 |
| GB | 2148847 | 6/1985 |
| GB | 2210020 | 6/1989 |
| WO | WO 96/07228 | 3/1996 |

* cited by examiner

*Primary Examiner*—Jack Chiang
(74) *Attorney, Agent, or Firm*—Dean W. Russell; Kilpatrick Stockton LLP

(57) ABSTRACT

A cable reel comprises a casing defining a cable exit opening and an access opening; a static electrical connection located externally of the casing; a spool rotatably received within the casing and having a circumferentially extending recess opening radially outwardly of the spool, the spool further having an inner axially extending recess and an axially open notch communicating between the circumferentially extending recess and the inner axially extending recess; a handset cable having a first end and a second end, the handset cable first end being attachable to a handset in use, at least a portion of the handset cable being windable into or out of the spool circumferentially extending recess upon rotation of the spool so as to extend from or retract into the cable exit opening; a ribbon cable having a first end and a second end, the ribbon cable first end being attached to the handset cable second end and the ribbon cable second end being attached to the static electrical connector whereby the ribbon cable is electrically connected between the static electrical connection and the handset cable; a cover, and releasable fastening means for removably and replaceably securing the cover over the access opening so that, with the cover removed, the spool is exposed in the access opening; whereby the handset cable with attached ribbon cable may be removed by unwinding from the spool and lifting from the notch for servicing or repair of the cable reel.

8 Claims, 6 Drawing Sheets

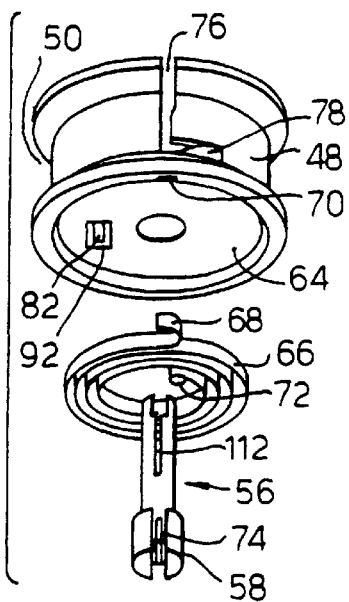
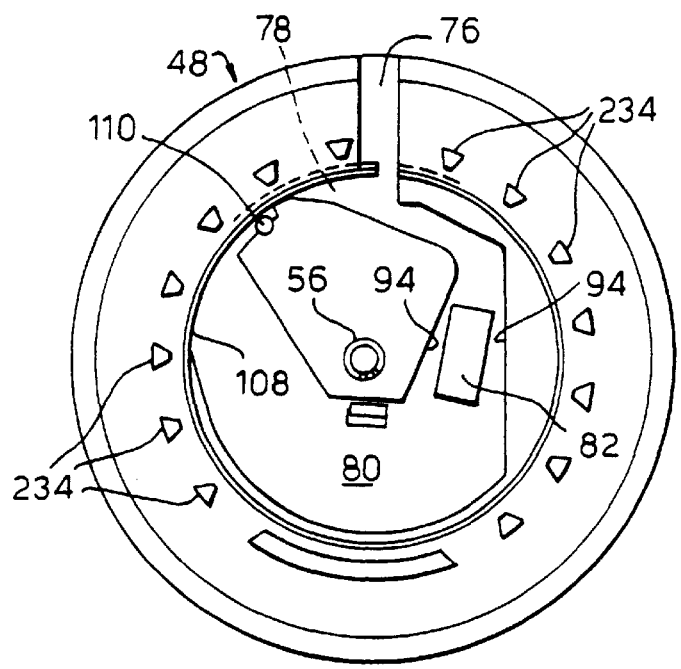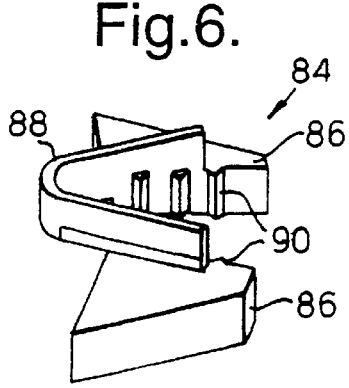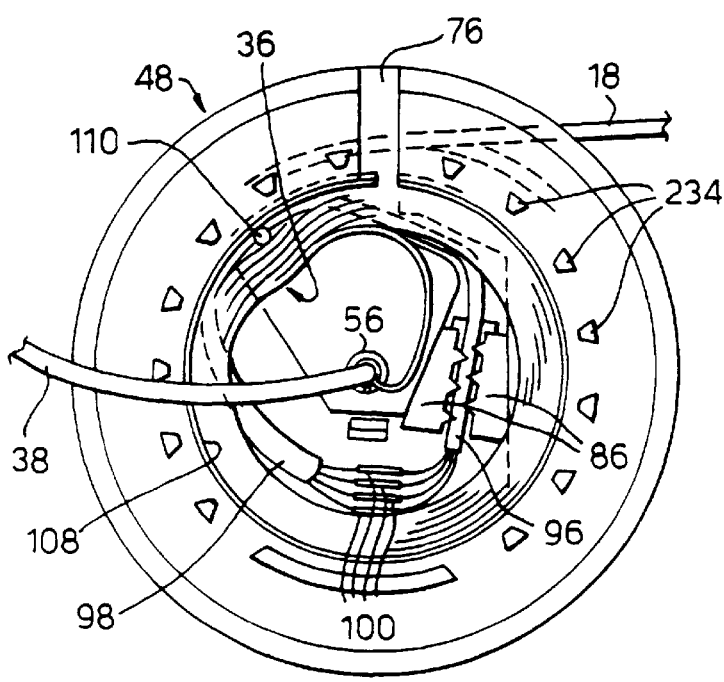

CRADLE FOR A HANDSET

This application is a continuation of U.S. application Ser. No. 08/987,396, filed with the U.S. Patent Office on Dec. 9, 1997, U.S. Pat. No. 6,282,289.

BACKGROUND OF THE INVENTION

1. Field of the Invention

This invention relates to a cable reel which may be used in conjunction with a cradle and a handset, such as a telephone handset or remote control for electronic apparatus, such as is typically but not exclusively used in various modes of mass transport including aircraft, vessels, rail and road passenger vehicles. Such handsets and cradles may also be used to facilitate audience participation or interaction in theatres, arenas, lecture theatres, libraries and similar locations.

2. Description of the Related Art

It is known to provide a cradle in the armrest of a chair, such as a seat in an aircraft, for housing a handset comprising, for example, a telephone and/or a remote controller for in-flight entertainment apparatus. Such handsets can also include call functions for the in-flight staff. A typical example is the model RU-AA6501-01 of Matsushita Electrical Industrial Company Limited of Osaka, Japan. Similar handsets and cradles may also be mounted in other locations such as in or on aircraft bulkheads or seat backs: see for example U.S. Pat. Nos. 5,128,993, 5,410,597 and 5,155,766.

Conventionally such cradles comprise a recess in which the handset is stowed and from which the handset can be removed for example by lifting. The handset is electrically powered and connected via a cable which is housed in and may be drawn from a cable reel as the handset is removed from the cradle. As the handset is stowed, the cable is rewound into the reel under spring action, so as to leave no potentially hazardous freely exposed cable loop. To simplify cradle installation as well as helping to ensure proper retraction of the cable, the reel may be housed in or mounted on the cradle, with the cable routed directly from the reel into the recess. Alternatively the cable reel may be mounted separately from the cradle with a cable run or guide extending therebetween (see for example U.S. Pat. No. 5,109,412 and International patent publication no. WO 95/29552).

With repeated use of the handset, the cable is prone to wear. The cable or reel are often provided with a releasable locking mechanism to relieve the spring tension on the extended cable and prevent this tension from being experienced by the user. The locking mechanism is likewise prone to wear and damage in use. Prior art cable reels are not readily serviced or repaired "on site", i.e. at the location (aircraft, vehicle, building etc) in which they are used. A particular difficulty arises because the handset cable is wound/unwound from a rotatable spool and connected to a ribbon cable coiled within the cable reel to provide an electrical connection between the moving handset cable and a stationary connector on the reel casing. The spool, handset cable and ribbon cable cannot be readily dismantled and reassembled without the use of specialist tools and off-site facilities.

To simplify manufacture, a prior art cable reel developed by the present applicants has a spool comprising a pair of flanges defining between them a circumferential groove from which the handset cable is wound and unwound, a central, axially extending recess in which the ribbon cable is housed, and a notch in one of the flanges into which the handset cable and an attached ribbon cable can be simply laid so as to pass from the groove into the recess without the need to thread the cables through the spool in a direction along the cable axes, or the need to subsequently make up a connection between the ribbon cable and the handset cable. However these prior cable reels are manufactured as sealed units, either as a discrete unit for use with a separate handset cradle, or integrated with a handset cradle which forms a sealed housing for the reel. In either case, on site servicing of the cable reel is not practicable. Once the cable or other internal components of the reel become worn or damaged the entire reel or cradle assembly must be discarded.

It is an object of the present invention to provide a cable reel which may be readily serviced on site without the need for special tools or equipment.

It is a further object of the invention to provide a cable reel having cable components which may readily be replaced without the use of special tools or equipment.

It is a further preferred object of the invention to provide a cable reel having a mechanism for locking the cable in an extended position against a retraction spring force, in which the mechanism is accessible for servicing or repair.

SUMMARY OF THE INVENTION

The invention provides a cable reel comprising:
- a casing defining a cable exit opening and an access opening;
- a static electrical connection located externally of the casing;
- a spool rotatably received within the casing and having a circumferentially extending recess opening radially outwardly of the spool, the spool further having an inner axially extending recess and an axially open notch communicating between the circumferentially extending recess and the inner axially extending recess;
- a handset cable having a first end and a second end, the handset cable first end being attachable to a handset in use, at least a portion of the handset cable being windable into or out of the spool circumferentially extending recess upon rotation of the spool so as to extend from or retract into the cable exit opening;
- a ribbon cable having a first end and a second end, the ribbon cable first end being attached to the handset cable second end and the ribbon cable second end being attached to the static electrical connector whereby the ribbon cable is electrically connected between the static electrical connection and the handset cable;
- a cover, and
- releasable fastening means for removably and replaceably securing the cover over the access opening so that, with the cover removed, the spool is exposed in the access opening; whereby the handset cable with attached ribbon cable may be removed by unwinding from the spool and lifting from the notch for servicing or repair of the cable reel.

The invention may also provide a cradle for a handset comprising:
- a casing defining an access opening and a cable exit opening, the cable exit opening communicating with a handset receiving recess formed in the casing;
- a static electrical connection located externally of the casing;
- a spool rotatably received within the casing;
- a handset cable having a first end and a second end, the handset cable first end being attachable to a handset in use, at least a portion of the handset cable being windable onto or off the spool upon rotation thereof so as to extend from or retract into the cable exit opening;

a ribbon cable having a first end and a second end, the ribbon cable first end being attached to the handset cable second end and the ribbon cable second end being attached to the static electrical connector whereby the ribbon cable is electrically connected between the static electrical connection and the handset cable;

a cover, and releasable fastening means for removably and replaceably securing the cover over the access opening so that, with the cover removed, the spool is exposed in the access opening for servicing or repair.

The invention may further provide a repair kit for a cable reel, comprising:

a static connector;

a ribbon cable having first and second ends, the ribbon cable first end being preassembled to the static connector; and a handset cable having first and second ends, the handset cable first end being preassembled to the ribbon cable second end.

The invention and various preferred objects, features and advantages thereof will be further understood from the following description of illustrative embodiments made with reference to the accompanying drawings.

BRIEF DESCRIPTION OF THE DRAWINGS

FIG. 4 is an exploded view of the spool shown in FIG. 3 with certain parts omitted for clarity;

FIG. 5 is a view from above showing the spool of FIG. 4 with a return spring and spindle assembly installed;

FIG. 6 shows a cable grip on an enlarged scale;

FIG. 7 is a view similar to FIG. 5 showing the spindle, ribbon cable and handset cable installed, with the handset cable in the retracted position.

DESCRIPTION OF THE PREFERRED EMBODIMENTS

Figure 1:
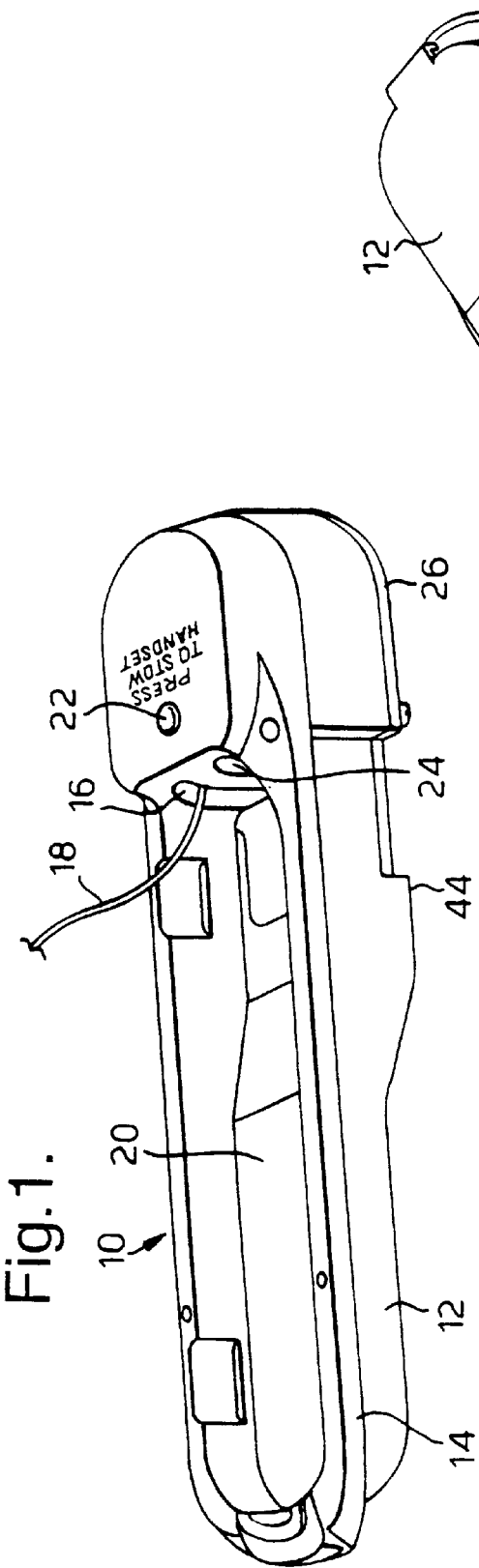
FIG. 1 is a perspective view from above of a handset cradle embodying the present invention.

Referring to FIG. 1, a cradle 10 for a telephone handset comprises a casing 12 having a collar 14 by which the cradle 10 may be located partially recessed within a chair arm (not shown). The casing 12 has a cable exit opening 16 from which a handset cable 18 extends into a handset stowage recess 20 (the handset not shown). The cradle 10 also has a spool brake release button 22 and, protruding into the stowage recess 20, a spool brake reset trigger 24 whose operation will be explained later.

Figure 2:
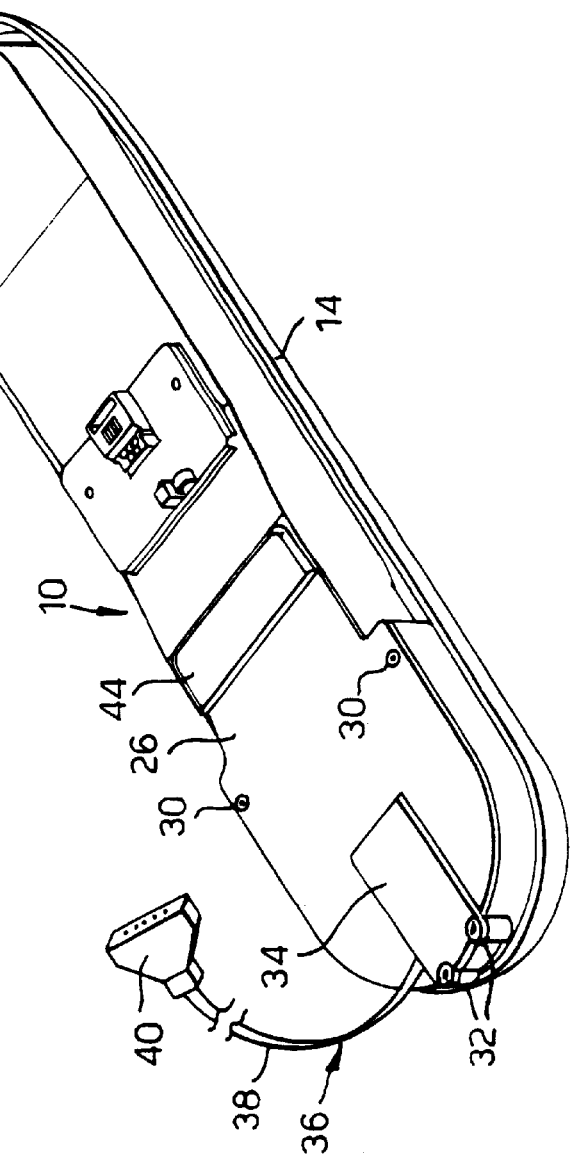
FIG. 2 is a perspective view from below of the cradle of FIG. 1.
Figure 3:
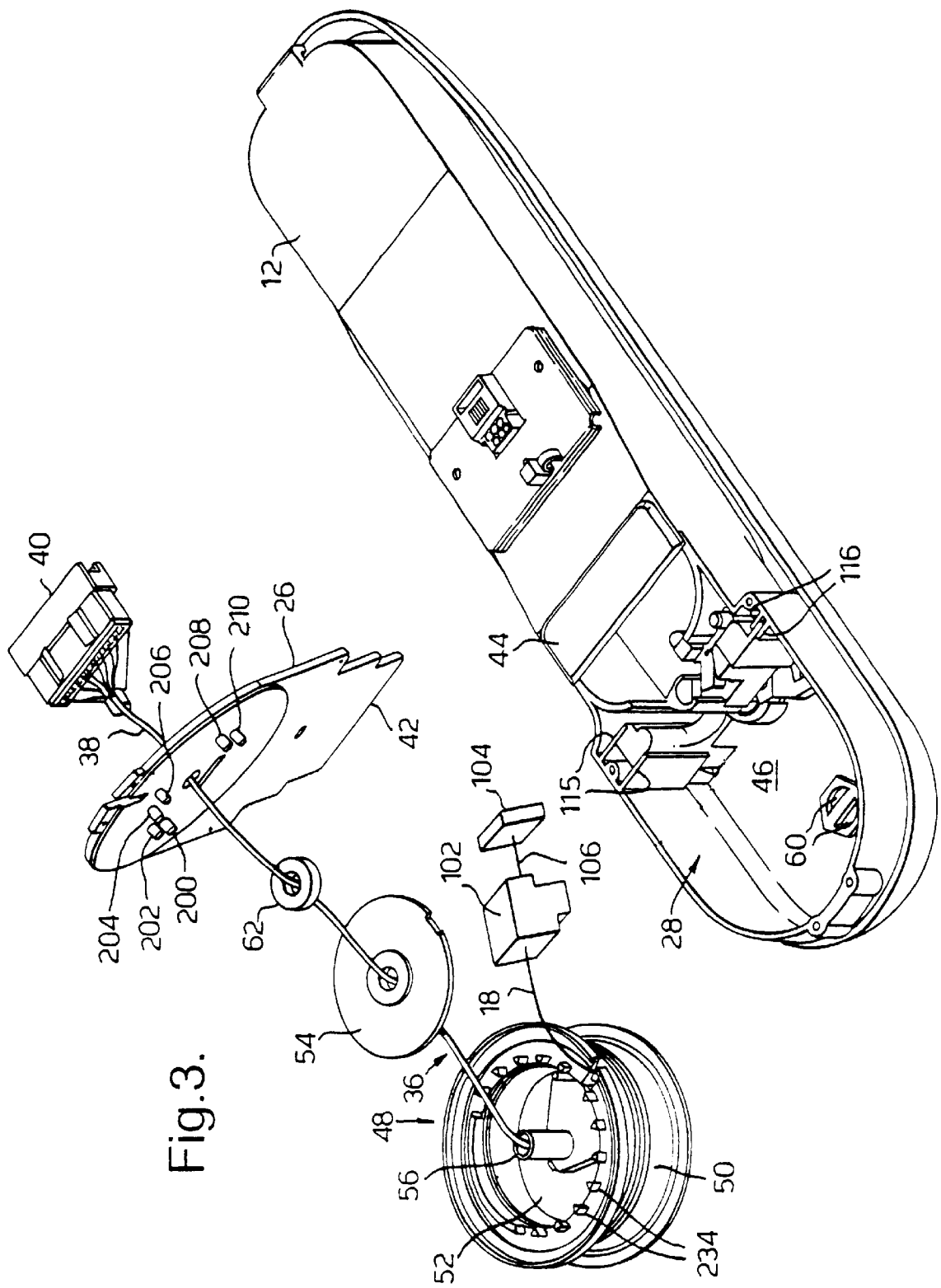
FIG. 3 shows the cradle of FIG. 1 partly assembled.

As best shown in FIGS. 2 and 3, a cover 26 is removably and replaceably secured over an access opening 28 formed in the bottom of the casing 12. Screws 30, 32 hold the cover 26 in place, with the screws 32 also securing a strain relieving outlet 34 for ribbon cable 36 second end 38. A static electrical connector in the form of a multiplug 40 is fixed to the ribbon cable second end 38. The cover 26 is further secured by a tongue 42 which engages beneath a lip 44 formed on the casing 12. The opening 28 gives access to a spool chamber 46 in which is housed a spool 48 having a radially outwardly opening, peripherally extending recess 50 from which the handset cable 18 is wound and unwound.

The spool 48 also has an inner, axially extending recess 52 which is closed by a snap fit lid 54 and houses a major portion of the ribbon cable 36 as further explained later. The spool 48 is rotatably carried on a hollow spindle 56 having a bifurcated end 58, FIG. 4, which is non-rotatingly snap fitted into a pair of D slots 60 formed in the bottom of spool chamber 46. As shown in FIG. 3, the cover 26 and lid 54 are threaded onto the ribbon cable second end 38 with a spacing washer 62 therebetween. When assembled, the free end of the spindle protrudes through lid 54, washer 62 and cover 26 so that the hollow spindle interior provides an exit route for the ribbon cable 36 from the spool inner recess 52 to beneath the strain relieving outlet 34.

As shown in FIG. 4, the spool 48 has a spring accommodating recess 64 disposed opposite the axial recess 52. A spiral spring 66 has a hooked end 68 engaged in an anchor slot 70 formed in the rim of recess 64. The other end 72 of the spring 66 is curled to fit within a slot 74 in the bifurcated end 58 of the spindle 56. As the spool 48 rotates relative to the spindle 56, the spring 66 is tensioned to provide a return bias for retracting the handset cable 18.

Referring to FIGS. 4 and 5, the spool 48 has an axially open notch 76 extending through the wall separating the peripherally extending recess 50 from the inner axially extending recess 52. A lower portion 78 of the notch 76 leads from the peripheral recess 50 to a depression 80 formed in the bottom of inner axially extending recess 52. A rectangular through hole 82 communicates between the depression 80 and the spring recess 64.

A pair of wedge blocks 86 having toothed faces 90 are joined by an offset flexible strap 88 to form a cord grip 84, FIG. 6. The strap 88 is passed through the hole 82 from the depression 80 to lie in a rebate 92 surrounding the end of the hole 82 where it enters the spring recess 64. The wedge blocks 86 lie between convergent flanks 94 of the depression 80 on either side of the hole 82.

Prior to installation in the spool 48, the handset cable second end 96 is electrically connected to the ribbon cable first end 98 by compact, high quality sheathed joints 100, formed for example by laser welding. FIG. 7 shows this connection in position in the spool 48. As may be seen from FIGS. 3 and 7, the static connection multiplug 40, ribbon cable 36, cover 26, spacer washer 62, lid 54, sheathed joints 100, handset cable 18, a handset strain relief block 102 and a handset multiplug 104 together constitute a wiring harness assembly installable in the spool 48 as a preassembled unit, thereby facilitating refurbishment and repair, as well as initial installation. The wiring harness assembly may thus be supplied as a repair kit for worn or damaged handset cradles 10.

With the spool 48, spring 66, spindle 56 and cord grip 84 subassembly snapped into the D-slots in the base of the spool cavity 28, the wiring harness assembly is installed by first dropping the handset cable second end 96 with attached ribbon cable 36 laterally into the notch 76 in the spool 48 and thence into the notch portion 78 so as to lead handset cable second end 96 out of the circumferential recess 50 and between the wedge blocks 86 of cord grip 84, to lie in the depression 80 at the bottom of inner axial recess 52. Pulling on the handset cable first end 106 causes the cord grip teeth 90 to securely grip the handset cable 18.

The ribbon cable first end 98 is led away from handset cable second end 96 in the depression 80 towards the curved vertical wall 108 of the inner axial recess 52. The ribbon cable is then folded through 90° to lie flat against the wall 108, being held there by a pin 110 which stands vertically from the floor of the inner axial recess 52. A substantial portion of the ribbon cable 36 is then neatly coiled against the wall 108, passing radially inwardly of the pin 110, coiled in the same direction (clockwise as shown) as the handset cable 18 is coiled in the circumferential recess 50. The remaining part of the ribbon cable 36 near its second end 38 passes into a longitudinal slot 112, FIG. 4, formed in the hollow spindle 56. This part of the ribbon cable 36 is pre-folded through 90° so as to pass up the interior of hollow spindle 56 to emerge from the free end thereof. The lid 54 is then snapped into place over the spool inner axial recess 52 and the spindle 56 free end. Finally the washer 62, cover 26 and strain relieving outlet 34 are installed over the spindle 56 free end.

As shown in FIG. 3, removal of the cover 26 also provides access to a spool brake mechanism 114 held captive between pairs of opposed flanges 115, 116. To facilitate repair, mechanism 114 may be lifted out as a unit from between the flanges 115, 116 once the cover 26 has been removed.

Figure 8:
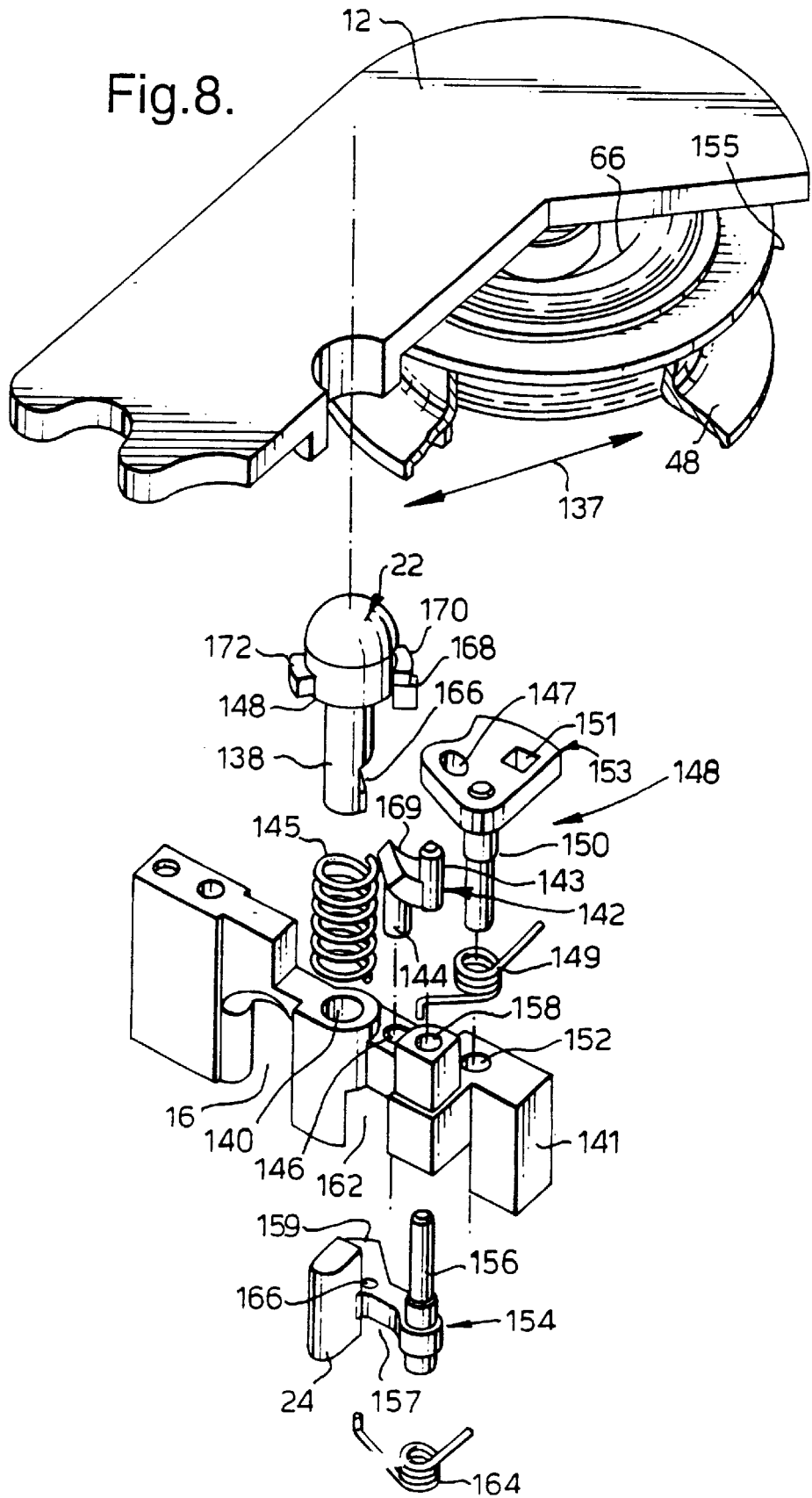
FIGS. 8–10 show a push button operated cable reel brake which may be used in the handset cradle of FIG. 1.
Figure 9:
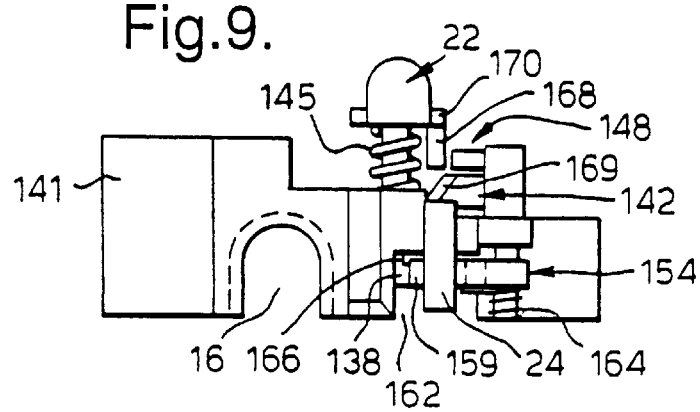
Figure 10:
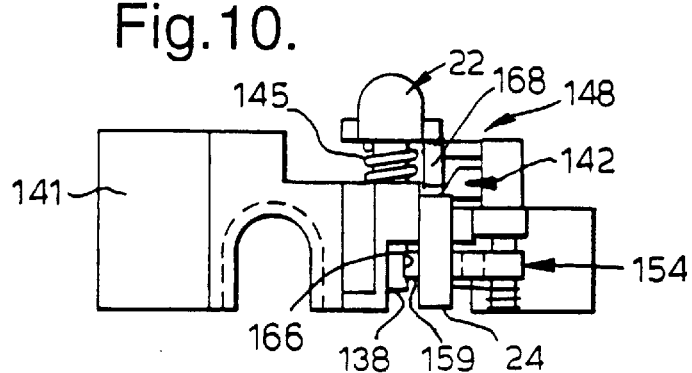

The spool braking mechanism 114 is shown in greater detail in FIGS. 8–10. It comprises a pushbutton 22 that is slideably received in a hole 140 formed in a mounting block 141 received between the flanges 115, 116. A compression spring 145 surrounding a shaft 138 of the pushbutton is received between the mounting block 141 and a shoulder 143 on the button. A toggle link 142 has a shaft 144 journalled in a hole 146 in block 141. A braking cam 148 (see also FIGS. 9 and 10) has a shaft 150 journalled in a hole 152 in block 141. A pin 143 of toggle link 142 is rotatably and slideably received in a slot 147 formed in cam 148. A torsion spring 149 has one arm braced in a hole (not shown) in the mounting block 141 and another arm held by a tang 151 on the cam 148 to bias it clockwise and bring a braking surface 153 into contact with a rim 155 of the spool 48. The radius of surface 153 increases in an anti-clockwise direction about shaft 150 as shown in FIG. 8. Handset cable 18 is drawn from and rewound onto the right hand side of the spool 48, as indicated by arrow 137. The cable passes through a smooth edged guide eye in block 141, constituting the cable exit opening 16. The cam braking surface 153 slides on the rim 155 to allow extension of the handset cable 18, but is wedged against rim 155 to prevent spring 66 from rewinding the cable 18.

Latch means 154 comprising a lever 157, a finger 159 and reset trigger 24 have a shaft 156 journalled in a hole 158 in the mounting block 141. Finger 159 extends into an aperture 162 in block 141 that communicates with button shaft hole 140. Lever 157, finger 159 and trigger 24 are biassed outwardly towards the handset stowage recess 20 by a torsion spring 164 mounted on shaft 156 with one end braced in a groove (not shown) in the lower face of block 141 and another end received in a hole 166 in lever 157.

As shown in FIG. 9, when the button 22 is in its normal raised position, spring 164 holds the finger 159 against the rear of the lower end of button shaft 138 in the aperture 162. Depressing the button 22 as in FIG. 10 causes the finger 159 to enter a detent groove 166 formed in the button shaft 138, latching the button depressed. As the button 22 is moved downward towards its latched state, a depending foot 168 provided on a button lug 170 engages a cam surface 169 on the toggle link 42, rotating the toggle link clockwise as shown in FIG. 8. Lugs 170, 172 slide in grooves (not shown) provided in the casing 12 to prevent the button 22 from rotating about its shaft 138. The toggle pin 143 rotates the cam 148 anti-clockwise to bring its braking surface 153 out of contact with the spool rim 155, allowing spring 66 to rewind the handset cable 18. As the handset (not shown) is replaced in the stowage recess 20, it presses against the trigger 24, disengaging the finger 159 from the detent groove 166, allowing the button 22 to pop up, releasing the cam 148 for contact between braking surface 153 and spool rim 155.

Figure 11:
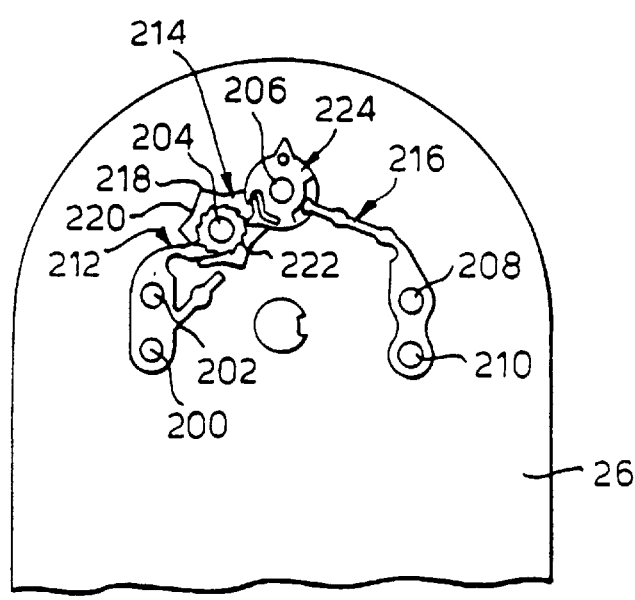
FIGS. 11–13 show an alternative cable reel brake.
Figure 12:
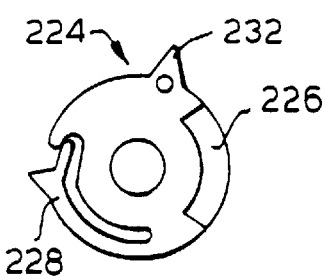
Figure 13:
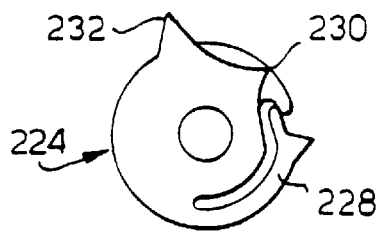

FIGS. 11–13 show an alternative spool brake mechanism. For ease of repair the mechanism components are mounted on pins 200, 202, 204, 206, 208, 210 moulded on the inside of the cover 26 (see FIGS. 3 and 11). The alternative brake mechanism thus may easily be supplied as a part of the repair kit comprising the wiring harness components 40, 36, 26, 62, 54, 100, 18, 102, 104. The brake mechanism parts are moulded from a resilient, self-lubricating plastics material such as nylon and comprise a ratchet stop/index spring finger 212 secured on pins 200, 202 using Loctite® 406, a star/ratchet wheel 214 rotatably mounted on pin 204, an oscillating pawl 224 rotatably carried on pin 206 and a centralising spring finger 216 secured on pins 208, 210 in similar manner to stop/index spring finger 212 and pins 200, 202.

The star/ratchet wheel 214 has six raised points 218 alternating with six troughs 220 about its periphery. It also has a raised hub with twelve peripheral ratchet teeth 222, which are engaged by a shoulder on the end of the stop/index finger 212 so as to allow the star wheel to rotate, anticlockwise as shown, in twelve discrete steps, thereby alternately presenting a point 218 or a trough 220 to the oscillating pawl 224 at each rotational step. The stop/index finger 212 also acts to prevent rotation of the star/ratchet wheel 214 in the clockwise direction, and retains the wheel 214 on the pin 204.

FIGS. 12 and 13 show somewhat enlarged views of the top and underside of the oscillating pawl 224 respectively. Centralising spring finger 216 engages in a slot 226 to retain the oscillating pawl 224 on pin 206 and to return it to a rotationally centralised position with some degree of lost motion. An indexing spring arm 228 moulded in one piece with the oscillating pawl 224 engages the ratchet teeth 222 to index the star/ratchet wheel 214 anticlockwise by one step with each clockwise oscillation of the pawl 224. The underside of the oscillating pawl 224 is provided with a projecting stop 230 which interacts with the star/ratchet wheel raised points 218 and troughs 220. In the centralised position of the pawl 224, depending upon the position of the star/ratchet wheel 214, either a point 218 lies immediately in front of the stop 230, thereby preventing anticlockwise rotation of the pawl 224, or the stop lies within a trough 220 which provides sufficient clearance for anticlockwise rotation of the pawl 224 to a limit governed by the centralising spring finger 216. In either position of the star/ratchet wheel 214, the pawl 224 is free to rotate clockwise from the centralised position to a limit controlled by the centralising spring finger 228.

The oscillating pawl 224 carries a tooth 232 positioned to engage a series of teeth 234 upstanding axially from and circumferentially distributed about the spool 48 (see FIGS. 3, 5 and 7). Pulling on the handset cable will rotate the spool 48 clockwise relative to the inside of the cover 26 on which the brake mechanism is located (or anticlockwise in the spool chamber 46, FIG. 3). This causes the spool teeth 234 to knock against the pawl tooth 232 in rapid succession, turning the pawl 224 clockwise in the reference frame of FIG. 11, and indexing the star/ratchet wheel 214 anticlockwise by one step or ratchet tooth 222. Supposing that initially, before pulling on the cable, a point 218 lies immediately in front of the stop 230. The oscillating pawl 224 cannot be rotated anticlockwise away from its centralised position in FIG. 11, which in turn means that the pawl tooth 214 engages one of the spool teeth 234, preventing the spool from rotating anticlockwise relative to the inside of the cover 26, so preventing the cable 18 from rewinding onto the spool under the influence of spring 66. In this condition, pulling on the handset cable 18 will now index a trough 220 into co-operation with the pawl 224, providing clearance for the stop 230. Consequently, releasing the handset cable 18 will now cause it to rewind under the action of spring 66, as the spool teeth 234 can knock aside the cam tooth 232, rotating the oscillating cam 224 anticlockwise in the FIG. 11 reference frame. Pulling and releasing the handset cable 18 yet again will index a point 218 back into co-operation with the stop 230, locking the spool against rewinding. In the result, with each successive pull and release, handset cable 18 is alternately free for, or locked against, retraction.

It will be readily apparent that different numbers of points 218 and troughs 220 can be provided on the star/ratchet wheel 214 in place of the six shown. The main requirement is that the total number of points plus troughs should be equal to the number of ratchet teeth 222.

Figure 14:
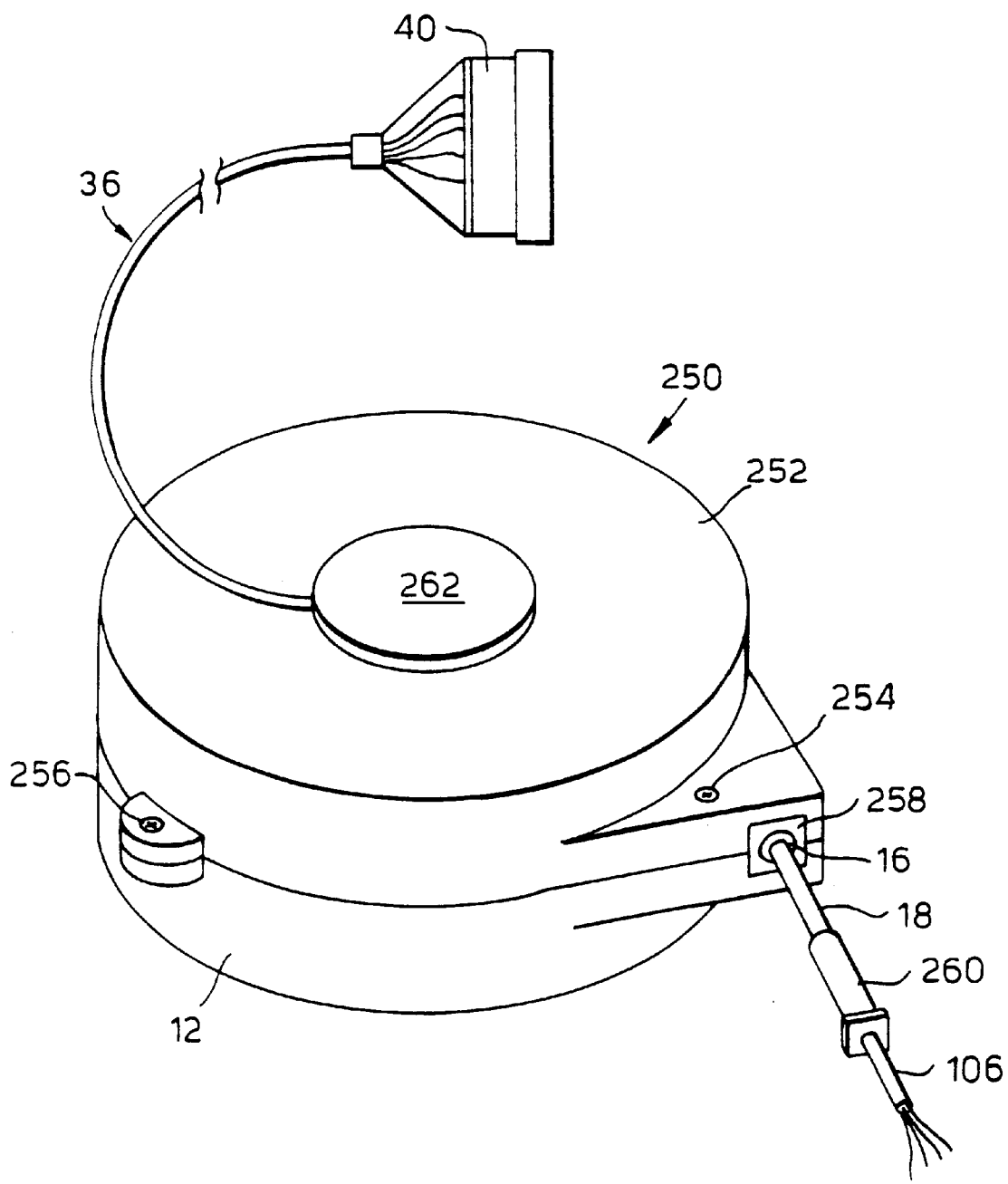
FIG. 14 is a perspective view of a discrete cable reel embodying the present invention.

FIG. 14 shows a discrete cable reel which forms a second embodiment of the invention that may be mounted remotely from a handset cradle. It comprises a casing 12 in which is housed a spool assembly substantially identical to the assembly 40, 36, 62, 54, 48, 56, 66, 84, 100, 18, of FIGS. 3–7, further description of which is therefore superfluous. In place of cover 26, there is a cover 252 secured to the casing 12 by screws 254, 256. The casing 12 comprises a cable eye 258 in which the cable exit opening 16 is formed. Eye 258 is held in place between the remainder of the casing 12 and the cover 252. In place of the strain relief block 102 and multiplug 104, the handset cable first end 106 carries a stop sleeve 260. The ribbon cable strain relieving outlet 34 shown in FIG. 2 is replaced by a cap 262 snap-fitted into slots (not shown) in cover 252. A spool braking mechanism substantially identical to mechanism 212, 214, 216, 224 of FIGS. 11–13 is mounted on pins moulded inside cover 252, engaging teeth similar to teeth 234 formed on the spool. Further description of this mechanism is again superfluous.

While the preferred embodiments and best mode of performing the invention have been particularly described and shown, the invention is not limited thereto and variation and modification of the illustrated embodiments will be readily apparent, within the scope and spirit of the invention as defined in the following claims.

What is claimed is:

1. A cable reel comprising:
    a casing defining a cable exit opening and an access opening;
    a static electrical connector located externally of the casing;
    a spool rotatably received within the casing and comprising a first radially extending flange and a second radially extending flange, said flanges defining between them a circumferentially extending recess opening radially outwardly of the spool, the spool further having a central recess extending axially inwardly of the first flange and an open notch communicating with the central recess and extending axially and radially through the first flange;
    a handset cable having a first end and a second end, the handset cable first end being attachable to a handset in use, at least a portion of the handset cable being windable into or out of the spool circumferentially extending recess upon rotation of the spool so as to extend from or retract into the cable exit opening;
    a ribbon cable having a first end and a second end, the ribbon cable first end being attached to the handset cable second end and the ribbon cable second end being attached to the static electrical connector, at least a major portion of the ribbon cable being confined with the casing to form an electrical connection between the static electrical connector and the handset cable;
    a cover, and
    releasable fastening means for removably and replaceably securing the cover over the access opening so that, with the cover removed, the spool is exposed in the access opening; whereby the handset cable with attached ribbon cable may be removed by unwinding from the spool and lifting from the notch for servicing or repair of the cable reel.

2. A cable reel as defined in claim 1 further comprising a spool brake mechanism accessible upon removal of the cover.

3. A cable reel as defined in claim 2 wherein the spool brake mechanism is disposed in the casing adjacent to the spool.

4. A cable reel as defined in claim 2 wherein the spool brake mechanism is disposed on the cover so as to lie inside the casing when the cover is secured over the access opening.

5. A handset cradle as defined in claim 2 wherein the spool brake mechanism is disposed on the cover so as to lie inside the casing when the cover is secured over the access opening.

6. A repair kit for replacement of corresponding parts in a cable reel, comprising:
    a static connector;
    a ribbon cable having first and second ends, the ribbon cable first end being connected to the static connector; and
    a handset cable formed separately from the ribbon cable and having first and second ends, the handset cable first end being preassembled in direct connection to the ribbon cable second end prior to installation of said kit in a said cable reel for replacement of said parts.

7. A repair kit as defined in claim 6, further comprising a cover for an access opening provided in the cable reel.

8. A repair kit as defined in claim 7, wherein the cover is preassembled on the ribbon cable, prior to said installation of said kit.

* * * * *